United States Patent Office 3,555,002
Patented Jan. 12, 1971

3,555,002
WATER-INSOLUBLE BENZIMIDAZOLONE CONTAINING MONOAZO DYESTUFFS
Joachim Ribka, Offenbach am Main, and Wolfgang Pretzer, Fischbach, Taunus, Germany, assignors to Farbwerke Hoechst Aktiengesellschaft vormals Meister Lucius & Bruning, Frankfurt am Main, Germany, a corporation of Germany
No Drawing. Filed Oct. 22, 1968, Ser. No. 769,711
Int. Cl. C09b 29/36
U.S. Cl. 260—157
7 Claims

ABSTRACT OF THE DISCLOSURE

Water-insoluble monoazo-dyestuffs consisting of 5-amino-isophthalic-diamides as diazo component and 5-acetoacetylamino-benzimidazolones as coupling component and process for their preparation. Said pigments are especially suitable for dyeing and printing plastics, caoutchouc, resins of natural or synthetic origin, fibrous textile materials or paper. Moreover, the pigments can be used for the preparation of dispersion paints, lacquers and printing inks.

The present invention relates to new and valuable, water-soluble monoazo dyestuffs of the general formula

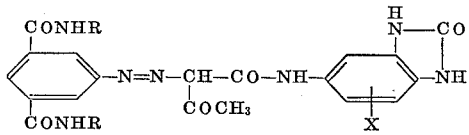

in which R represents a hydrogen atom or an alkyl group containing 1 to 4 carbon atoms and X stands for a hydrogen or halogen atom such as chlorine or bromine or a methyl, methoxy or ethoxy group and to a process for preparing them which comprises coupling diazonium compounds of 5-amino-isophthalic acid amides having the general formula

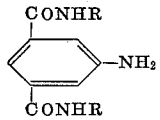

with 5-acetoacetylamino-benzimidazolones of the general formula

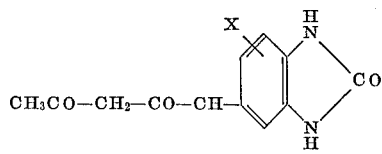

wherein R and X are defined as above.

The diazo components may be prepared by known methods, for example by reacting 5-nitro-isophthalic acid dichloride with ammonia or alkylamines having 1 to 4 carbon atoms or by reaction of 5-nitro-isophthalic acid esters and said compounds at raised temperatures. The so-obtained 5-nitro-isophthalic acid diamides can be transformed by catalytic reduction into the 5-amino-isophthalic acid diamides.

The coupling reaction may proceed in known manner, particularly in an aqueous medium, advantageously, in the presence of a non-ionic, anionic or cationic dispersing agent.

In order to obtain crystals of especially adequate structure, the coupling mixture is usefully heated for some time, for example to the boil or under pressure at temperatures above 100° C., if desired, in the presence of an organic solvent, for example dichlorobenzene or dimethylformamide or resin soap. Dyeings of remarkable purity and fastness are achieved when the dyestuffs of the invention are, after the coupling, treated as moist press cakes or dry powders with an organic solvent, for example pyridine, dimethylformamide, alcohol, glycol, glycolmonomethyl ether, glacial acetic acid, chlorobenzene, dichlorobenzene or nitrobenzene, either under reflux or at superatmospheric pressure at an elevated temperature or ground with a grinding auxiliary.

The dyestuffs may as well be coupled in the presence of carrier materials suitable for preparing colored lacquers.

The new pigment dyestuffs are appropriate for the production of printing inks, colored lacquers or dispersion paints, for coloring caoutchouc, plastics, resins of natural or synthetic origin. Furthermore they may serve for pigment printing on a substrate, particularly on fibrous textile materials or other structures having a flat surface, for example paper as well as for other uses, for example in a finely divided form for spin-coloration of viscose rayon or cellulose ethers or esters, polyamides, polyurethanes, polyglycol terephthalates or polyacrylonitrile or for colouring paper.

The dyestuffs of the invention are easy to work in the above-mentioned media. The dyeings display good fastness to light, weathering and migration. They are resistant to the action of heat and chemicals, especially solvents.

The following examples illustrate the invention but they are not intended to limit it thereto, the parts and percentages being by weight unless otherwise mentioned.

EXAMPLE 1

18 parts of 5-amino-isophthalic acid diamide were stirred for 15 minutes with 50 parts by volume of glacial acetic acid. The mixture was subsequently diazotized at 20° C. with an equivalent amount of nitrosylsulfuric acid, stirred on for 30 minutes, poured in 400 parts by volume of water and clarified with kieselguhr. A possible excess of nitrous acid was destroyed with amidosulfonic acid.

24 parts of 5-acetoacetylamino-benzimidazolone were dissolved at 20°–25° C. in a mixture of 200 parts by volume of water and 30 parts by volume of 10-normal sodium hydroxide solution. The solution was clarified with charcoal and the coupling components precipitated from the filtrate by adding 18 parts by volume of glacial acetic acid while stirring at 10° C. Subsequently, 20 parts by volume of an aqueous 10% solution of a reaction product of about 20 mols of ethylene oxide and stearyl alcohol were added thereto. Into this coupling component suspension the diazo solution was introduced at about 20° C. with thorough stirring while maintaining the pH value of about 5.5 constant. The coupling was immediately complete. The coupling mixture was heated to the boil, the product suction-filtered hot, washed thoroughly with water and dried at 65° C. The resulting yellow pigment was pulverized and heated for one and a half hours with 600 parts by volume of glacial acetic acid at 90° C. Thereafter, the dyestuff was suction-filtered, washed with methanol and water until free from glacial acetic acid and dried. A yellow soft-grained pigment of a pure coloration was obtained which incorporated in polyvinylchloride, a lacquer, a printing paste or a dispersion paint yielded yellow dyeings very fast to light, overvarnishing and bleeding in polyvinyl chloride and very resistant to the action of heat.

EXAMPLE 2

23.5 parts of 5-amino-isophthalic acid-bis-N,N'-ethylamide were stirred together for about one hour with 60 parts by volume of 5 N hydrochloric acid and 60 parts by volume of water. The whole was diluted with 150 parts by volume of water and diazotized at 0°–5° C. with 20 parts by volume of 5-normal sodium nitrite solution. The solution was clarified with kieselguhr and a possible excess of nitrous acid removed with amidosulfonic acid.

The diazo solution was poured at approximately 20° C. with good stirring in an acetic acid suspenison of the coupling component prepared as follows:

24 parts of 5-acetoacetylamino-benzimidazolone were stirred at 20°–25° C. with 200 parts by volume of water and dissolved in the presence of 30 parts by volume of 10-normal sodium hydroxide solution. After clarification with charcoal the solution was introduced in about 30 minutes with thorough stirring into a solution of 300 parts by volume of water, 41 parts by volume of glacial acetic acid and 40 parts by volume of 10-normal sodium hydroxide solution containing, in addition, 20 parts by volume of a 35% aqueous solution of a reaction product of about 30 mols, of ethylene oxide and oleyl alcohol.

The coupling reaction was very quickly complete. The coupling mixture was brought to the boil, the product solution filtered, thoroughly washed with water and dried at 65° C.

The resulting reddish yellow pigment of good tinctorial strength yielded dyeings of analogous very good fastness properties as provided the dyestuff of Example 1.

EXAMPLE 3

The coupling was conducted as described in Example 2. The dry dyestuff power was subsequently heated for 75 minutes to 70° C. together with 300 parts by volume of glacial acetic acid. It was suction-filtered, washed with methanol and water until free from glacial acetic acid and dried.

In the described manner a pigment was obtained yielding substantially more greenish yellow dyeings than the dyestuff prepared in accordance with Example 2 but having analogous very good fastness properties.

EXAMPLE 4

26.3 parts of 5-amino-isophthalic acid bis-N,N'-isopropylamide were diazotized as disclosed in Example 2. The coupling component suspension was prepared and the coupling conducted according to the same example.

The so-obtained dry dyestuff powder was heated for one and a half hours with 470 parts by volume of glacial acetic acid to 100° C., isolated by suction-filtration, washed with methanol and water until free from glacial acetic acid and dried.

The resulting pigment yielded reddish yellow colorations and practically corresponded in regard to fastness properties to the dyestuff of Example 1.

EXAMPLE 5

The coupling was performed as indicated in Example 4. The dry dyestuff power was subsequently heated for 2 hours together with 280 parts by volume of o-dichlorobenzene. The dyestuff was isolated by suction-filtration and washed with methanol until free from o-dichlorobenzene, finally washed with water and dried.

The so-obtained pigment yielded dyeings which, practically, displayed as good fastness properties as the dyestuff of Example 4, however essentially more greenish in shade.

EXAMPLE 6

20.8 parts of 5-amino-isophthalic acid bis-N'N'-methylamide were diazotized in the manner of Example 2.

The coupling component suspension was prepared as follows:

25 parts of 7 - methyl - 5-acetoacetylaminobenzimidazolone were dissolved in a mixture of 200 parts by volume of water and 60 parts by volume of 10 N sodium hydroxide solution at between 20°–25° C. After clarifying with charcoal the coupling component was precipitated from the filtrade by addition of 18 parts by volume of glacial acetic acid while stirring at 30° C.

The coupling was carried out as indicated in Example 1.

The dry dyestuff power was subsequently heated for 4 hours with 360 parts by volume of glacial acetic acid to 100°–110° C. After suction-filtration, washing with methanol and water and drying a yellow pigment was obtained having as good fastness properties as the dyestuff of Example 1.

The following table shows a number of further dyestuffs that can be obtained in analogous manner and features the shades that gave said dyestuffs in prints.

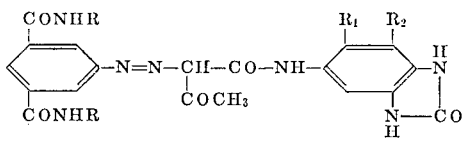

| R | R₁ | R₂ | Tint |
| --- | --- | --- | --- |
| H | H | Cl | Greenish yellow. |
| H | Cl | H | Yellow. |
| H | H | Br | Greenish yellow. |
| H | H | CH₃ | Yellow. |
| H | CH₃ | H | Greenish yellow. |
| H | OCH₃ | H | Yellow. |
| CH₃ | H | H | Do. |
| CH₃ | H | Cl | Do. |
| CH₃ | Cl | H | Greenish yellow. |
| CH₃ | H | Br | Yellow. |
| CH₃ | H | CH₃ | Do. |
| CH₃ | CH₃ | H | Reddish yellow. |
| C₂H₅ | H | H | Greenish yellow. |
| n-C₃H₇ | H | H | Yellow. |
| i-C₃H₇ | H | CH₃ | Reddish yellow. |
| i-C₃H₇ | CH₃ | H | Do. |
| n-C₄H₉ | H | H | Greenish yellow. |
| i-C₄H₉ | H | H | Yellow. |

What is claimed is:

1. A compound of the formula:

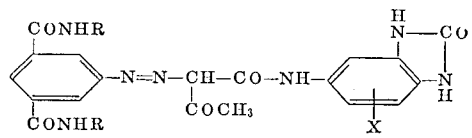

wherein R is hydrogen or alkyl having 1 to 4 carbon atoms and X is hydrogen, chlorene, bromine, methyl, methoxy or ethoxy.

2. The compound of the formula:

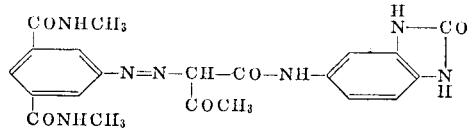

3. The compound of the formula:

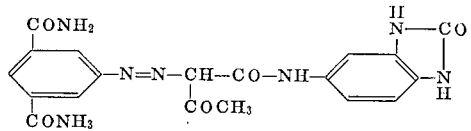

4. The compound of the formula:

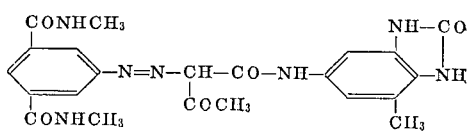

5. The compound of the formula:
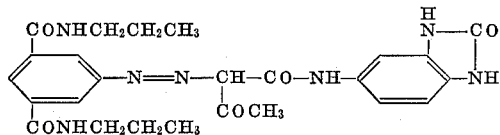
6. The compound of the formula:
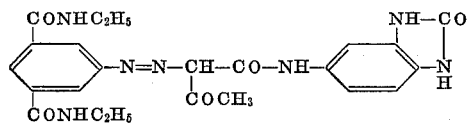
7. The compound of the formula:
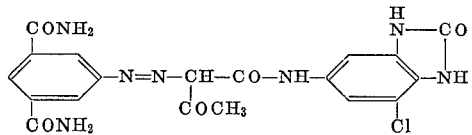
References Cited
UNITED STATES PATENTS
3,328,384   6/1967   Dietz et al. _____ 260—157
CHARLES B. PARKER, Primary Examiner
D. M. PAPUGA, Assistant Examiner
U.S. Cl. X.R.
260—37, 309.2, 558; 8—4, 41, 55; 106—22, 288; 117—154